United States Patent

Winkelmann et al.

[11] 3,900,482
[45] Aug. 19, 1975

[54] 1-(PYRIDYL-THIOALKYL)-2-ALKYL-5-NITRO-IMIDAZOLES

[75] Inventors: Erhardt Winkelmann, Kelkheim, Taunus; Wolfgang Raether, Dreieichenhain, both of Germany

[73] Assignee: Hoechst Aktiengesellschaft, Frankfurt am Main, Germany

[22] Filed: Dec. 19, 1973

[21] Appl. No.: 426,081

[30] Foreign Application Priority Data
Dec. 21, 1972 Germany.......................... 2262552

[52] U.S. Cl.......................... 260/294.8 G; 424/263
[51] Int. Cl............................................. C07d 31/40
[58] Field of Search............................ 260/294.8 G

[56] References Cited
UNITED STATES PATENTS
3,635,995  1/1972  Manning..................... 260/294.8 G OTHER PUBLICATIONS
Blenkinsop, "Chem. Abstracts," Vol. 66, 1967, p. 8905, No. 95045t.

*Primary Examiner*—Henry R. Jiles
*Assistant Examiner*—Robert W. Ramsuer
*Attorney, Agent, or Firm*—Curtis, Morris & Safford

[57] ABSTRACT

1-(pyridyl-thioalkyl)-2-alkyl-5-nitro-imidazoles of the formula

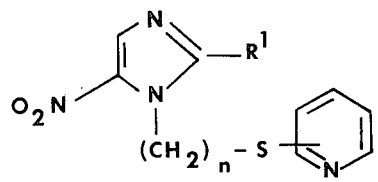

in which $R_1$ is hydrogen, methyl or ethyl, $-(CH_2)_n-$ is an alkyl chain of 2 to 4 carbon atoms which may be branched and to which the pyridyl group is linked in 2-, 3- or 4-position via a sulfur atom, are prepared by reaction of 1-(ω-halogeno-alkyl)-2-alkyl-5-nitro-imidazole with mercapto-pyridine in the presence of an acid-binding agent or by reaction of 2-alkyl-5-nitro-imidazole with ω-halogeno-alkyl-thio-pyridine in the presence of an acid-binding agent or with ω-hydroxy-alkyl-thio-pyridine in the presence of a condensation agent or with an aryl-sulfonyloxy-alkyl-thio-pyridine. The products of the invention are suitable for the treatment of protozoal diseases.

3 Claims, No Drawings

1-(PYRIDYL-THIOALKYL)-2-ALKYL-5-NITRO-IMIDAZOLES

The present invention relates to 1-(pyridyl-thioalkyl)-2-alkyl-5-nitro-imidazoles and to a process for their manufacture.

According to German Offenlegungsschrift No. 2,062,040, 1-(2'-ethyl-thioethyl)-2-methyl-5-nitro-imidazole is a substance which itself is not effective against protozoa but is suitable as starting material for the preparation of 1-(2'-ethyl-sulfonylethyl)-2-methyl-5-nitro-imidazole (Tinidazol) which is active against protozoa.

1-(2'-hydroxyethyl)-2-methyl-5-nitroimidazole (Metronidazol) is being used for the treatment of protozoal diseases, such as trichomoniasis and amebiasis.

This invention relates to 1-(pyridyl-thioalkyl)-2-alkyl-5-nitro-imidazoles of the formula I

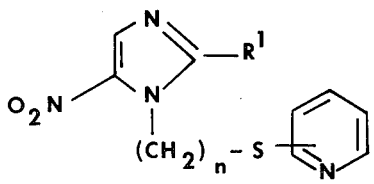

in which $R_1$ stands for a hydrogen atom, a methyl or ethyl group, —$(CH_2)_n$— stands for an alkyl chain of 2 to 4 carbon atoms which may be branched and to which the pyridine ring is linked in 2-, 3- or 4- position via the sulfur atom.

The novel compounds have a pronounced activity against trichomonads and amebae, which is superior to the 5-nitro-imidazoles mentioned above.

The compounds of the invention are obtainable by a process which comprises
a. reacting a 1(ω-halogeno-alkyl)-2-alkyl-5-nitro-imidazole of the formula II

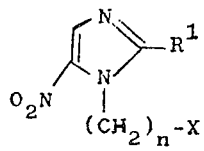

in which $R_1$ is defined as above and X stands for a halogen atom, with a mercapto-pyridine of the formula III

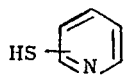

in the presence of an acid-binding agent, or
b. reacting a 2-alkyl-5-nitro-imidazole of the formula IV

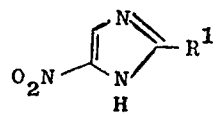

with an ω-halogeno-alkyl-thiopyridine of the formula V

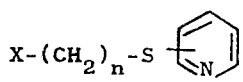

in the presence of an acid-binding agent, or
c. with an ω-hydroxy-alkyl-thiopyridine of the formula VI

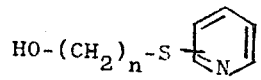

in the presence of a condensation agent, or
d. with an aryl-sulfonyloxy-alkyl-thiopyridine of the formula VII

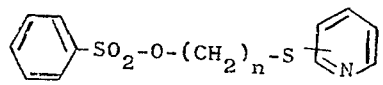

The reaction is advantageously carried out using equimolar amounts of the reactants and a solvent or dispersing agent. Depending on the method chosen, different solvents are used; for example according to method (a), a polar aprotic solvent, such as dimethylformamide, dimethylacetamide; according to method (b), an unpolar solvent, such as benzene, toluene, xylene, and according to method (c), ketones, such as acetone, methylethyl-ketone, methyl-butyl-ketone, are preferably used, whilst according to method (d) solvents are preferably not used.

Depending on the method chosen and on the solvents used, the reaction temperature may be in the range of from 0° to 200°C. For example, according to method (c), room temperature is preferable; according to methods (a) and (b) temperatures of from 110° to 130°C and according to method (d) temperatures of from 150° to 170°C are preferably used.

Suitable acid-binding agents include auxiliary bases, for example triethylamine, pyridine, alkali metal and alkaline earth metal hydroxides, which may advantageously be added in molar amounts or in an excess.

Suitable condensation agents include Lewis acids, for example zinc-II-chloride, tin-II-chloride, aluminium chloride, which may advantageously be added in molar amounts or in an excess.

Depending on the method chosen and the reaction conditions used, the reaction times are in the range of from a few seconds to several hours.

Depending on the method chosen, the reaction products are isolated according to the usual methods by distillation of the solvent used or dilution of the reaction solution with water. Where required, they may be purified by recrystallization from a suitable solvent or mixture of solvents.

The 1(pyridyl-thioalkyl)-2-alkyl-5-nitro-imidazoles are suitable for the treatment of protozoal diseases in mammals, as they are caused, for example, by infections with Trichomonas vaginalis and Entamoeba histolytica. The novel compounds of the invention may be administered orally or locally. For the oral route, they are usually administered in the form of tablets and capsules which contain, per daily dosage unit, about 10 to 750 mg of the active substance in admixture with a conventional diluent and/or excipient. For local administration, jellies, creams, ointments or suppositories may be used.

Whilst the known 1-alkyl-thioalkyl-2-alkyl-5-nitro-imidazoles have not got any activity against protozoa, the novel compounds of the invention have a pronounced activity against trichomonads and amebae as well as a good compatibility.

The following Examples serve to illustrate the invention.

EXAMPLE 1: (test for activity)

Activity against Trichomonas foetus was generally tested on home-bred albino mice (NMRI-strain) of both sexes. The body weight of each animal was from 10 to 12 grams.

The substance to be tested was administered orally by means of an esophagal sound either in an aqueous solution, or in the case of sparingly water-soluble compounds, in a Tylose suspension. The overall dosage was administered in two units, the first one two hours prior to infection and the second one two hours after infection. 4 Mice were used for each substance to be tested and for each dosage.

Infection was brought about by intraperitoneal injection of 19 million infective agents per animal in a suspension of 0.5 ml of a culture medium, Merck I. The standard Metronidazol was administered by the same route and in the same dosage as the substance to be tested (see Table I).

As infection controls were generally used 10 mice which, after infection, were not being treated any more. Another 5 mice served as a zero control (animals which were not treated and not infected).

Six days after infection, all the test animals were killed and the peritoneal exudate was examined for trichomonads. Mice which had died before were subjected to the same examination.

The test substance was judged on the concentration of infective agents to be found in the peritoneal exudate on the sixth day after infection. For this purpose, the concentration of infective agents established with the tested composition was compared to that of the standard and of the infection control. The scheme, according to which the tested substance and the standard were judged with regard to the concentration of infectants established, was the following:

ineffective: Concentration of infectants was not substantially reduced as compared to infection control.
 Judgement: 3; 4
effective: a. faint: Concentration of infectants moderately reduced as compared to infection control.
 Judgement: 2
b. unsatisfactory: Concentration of infectants substantially reduced as compared to infection control.
 Judgement: 1
c. no infective agents to be established.
 Judgement: 0

TABLE 1

| Composition | dosage in mg/kg mouse, per os | | | concentration of infectant Trichomonas foetus in 4 mice |
|---|---|---|---|---|
| I | 2 | × | 150 | 0 0 0 0 |
|  | 2 | × | 100 | 0 0 0 0 |
|  | 2 | × | 50 | 0 0 0 0 |
|  | 2 | × | 25 | 0 0 0 1 |
|  | 2 | × | 12.5 | 0 2 3 0 |
| II | 2 | × | 150 | 0 0 0 0 |
|  | 2 | × | 100 | 0 0 0 0 |

TABLE 1 — Continued

| Composition | dosage in mg/kg mouse, per os | | | concentration of infectant Trichomonas foetus in 4 mice |
|---|---|---|---|---|
|  | 2 | × | 50 | 0 0 0 0 |
|  | 2 | × | 25 | 2 0 2 2 |
|  | 2 | × | 12.5 | 4 4 4 4 |
| infection controls | — | | | 4 4 4 4 |

I = product of the invention: 1-(4'-pyridyl-thioethyl)-2-methyl-5-nitro-imidazole II = comparative composition: Metronidazol

EXAMPLE 2: (test for activity)

Activity against Entamoeba histolytica was generally tested on cross-bred gold hamsters of both sexes. The body weight of each animal was generally in the range of from 50 to 60 grams.

The substance to be tested was administered orally by means of an esophagal sound, either in an aqueous solution or, in the case of sparingly water-soluble compounds, in a Tylose suspension. The overall dosage was administered in four units, the first one 2 hours prior to infection, the second one 2 hours after infection, the third one 1 day after infection and the fourth one 2 days after infection. 4 Hamsters were used for each substance to be tested.

Infection was brought about by intrahepatical injection of 130,000 infective agents per animal as a suspension in 0.1 ml of TTY medium (E. hist.-Crithidia culture). The standard Metronidazol was administered by the same route and in the same dosage as the substance to be tested (see Table 2.)

As infection controls were generally used for 10 hamsters which were, after infection, not treated any more. Another 5 hamsters served as a zero control (animals which were not treated and not infected).

Six days at the earliest and eight days at the latest after infection, all the animals were killed. Subsequently, the liver's state was judged according to the degree of icteric necrosis developed. Hamsters which had died before were subjected to the same examination.

The liver findings as obtained with the tested composition and with the standard substance were compared to those of the infection controls. The scheme, according to which the liver findings (with tested composition and standard composition) were judged, was the following:

ineffective: Icteric necrosis did not show any substantial difference from that of infection controls.
 Possible judgement: 3; 4 (in rare cases: 2),
effective: a. faint: Icteric necrosis was less developed than with the infection controls.
 Possible judgement: frequently 2 (in rare cases: 1),
b. unsatisfactory: Icteric necrosis was substantially reduced as compared to infection controls.
 Possible judgement: 0 (in rare cases), predominantly 1; 2 (in rare cases),
c. good: no icteric necrosis was discovered.
 Judgement: 0

TABLE 2

| Composition | dosage in mg/kg gold hamster, per os | | | liver findings Entamoeba histo- lytica (extra- intestinal) in 4 gold hamsters |
|---|---|---|---|---|
| I | 4 | × | 150 | 0 0 0 0 |
|  | 4 | × | 100 | 0 0 0 0 |
|  | 4 | × | 50 | 0 0 0 1 |
|  | 4 | × | 25 | 0 1 2 0 |
| II | 4 | × | 150 | 0 0 0 0 |
|  | 4 | × | 100 | 0 0 0 0 |
|  | 4 | × | 50 | 0 1 0 0 |
|  | 4 | × | 25 | 2 0 2 0 |
| infection controls | — | | | 4 4 4 4 |

I = product of the invention: 1-(4'-pyridyl-thioethyl)-2-methyl-5-nitroimidazole II = comparative composition: Metronidazol EXAMPLE 3: (Preparation of active substances):

1. 1-(2'-pyridyl-thioethyl)-2-methyl-5-nitro-imidazole 2.3 g(0.1 mol) of metallic sodium were dissolved in small portions in 50 ml of anhydrous methanol. Another solution of 11.0 g (0.1 mol) of 2-mercaptopyridine in 70 ml of anhydrous methanol was introduced into this sodium methylate solution, and the solution was evaporated in vacuo until no liquid was left. A solution of 19.0 g (0.1 mol) of 1-(2'-chloroethyl)-2-methyl-5-nitro-imidazole in 60 ml of dimethylacetamide was added to this residue and the reaction mixture was heated to 120°C for 15 minutes on an oil bath. After cooling, water was added to the solution until crystallization set in. The end product was suctionfiltered and recrystallized from methanol.

Thus, 20.2. g of 1-(2'-pyridyl-thioethyl)-2-methyl-5-nitro-imidazole (corresponding to 77 % of the theoretical yield) were obtained in the form of cream-colored crystals which melted at 121°C.

2. In the same manner, there was obtained, with good yield, 1-(4'-pyridyl-thioethyl)-2-methyl-5-nitro-imidazole which melted at 128°C.

Preparation of starting substance 1-(2'-chloroethyl)-2-methyl-5-nitro-imidazole used as a starting substance was prepared according to J. Med. Chem. 11, 371 (1968).

What is claimed is:

1. A 1-(pyridyl-thioalkyl)-2-alkyl-5-nitro-imidazole of the formula I

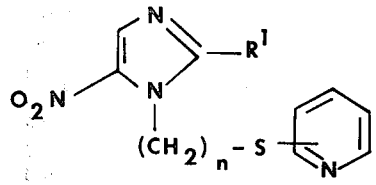

in which $R_1$ stands for hydrogen, methyl or ethyl, —$(CH_2)_n$— stands for alkyl of from 2 to 4 carbon atoms, to which the pyridine ring is linked in 2-, 3- or 4-position via the sulfur atom.

2. A compound as claimed in claim 1 which is 1-(2'-pyridylthioethyl)-2-methyl-5-nitro-imidazole.

3. A compound as claimed in claim 1, which is 1-(4'-pyridylthioethyl)-2-methyl-5-nitro-imidazole.

* * * * *